US008203450B2

United States Patent
German et al.

(10) Patent No.: US 8,203,450 B2
(45) Date of Patent: Jun. 19, 2012

(54) INTELLIGENT MPO-TO-MPO PATCH PANELS HAVING CONNECTIVITY TRACKING CAPABILITIES AND RELATED METHODS

(75) Inventors: Michael German, Secaucus, NJ (US); Daniel W. Macauley, Fishers, IN (US); Peter T. Tucker, Dallas, TX (US)

(73) Assignee: CommScope, Inc., Hickory, NC (US)

( * ) Notice: Subject to any disclaimer, the term of this patent is extended or adjusted under 35 U.S.C. 154(b) by 1205 days.

(21) Appl. No.: 11/968,360

(22) Filed: Jan. 2, 2008

(65) Prior Publication Data

US 2009/0166404 A1 Jul. 2, 2009

(51) Int. Cl.
*G08B 13/14* (2006.01)

(52) U.S. Cl. .................. 340/572.1; 340/572.7; 340/10.1

(58) Field of Classification Search ............... 340/572.1, 340/572.7, 572.8, 539.1, 10.1, 10.4, 10.51, 340/825.69, 825.7, 572, 10.2; 375/100, 101; 235/492; 385/78, 100
See application file for complete search history.

(56) References Cited

U.S. PATENT DOCUMENTS

| 6,002,331 | A | 12/1999 | Laor |
| 6,222,908 | B1 | 4/2001 | Bartolutti et al. |
| 6,234,830 | B1 | 5/2001 | Ensz et al. |
| 6,285,293 | B1 | 9/2001 | German et al. |
| 6,330,307 | B1 | 12/2001 | Bloch et al. |
| 6,350,148 | B1 | 2/2002 | Bartolutti et al. |
| 6,424,710 | B1 | 7/2002 | Bartolutti et al. |
| 6,437,894 | B1 * | 8/2002 | Gilbert et al. ............... 398/164 |
| 6,522,737 | B1 | 2/2003 | Bartolutti et al. |
| 6,784,802 | B1 | 8/2004 | Stanescu |
| 6,968,994 | B1 | 11/2005 | Ashwood Smith |
| 7,170,393 | B2 * | 1/2007 | Martin ......................... 340/10.1 |
| 7,374,101 | B2 * | 5/2008 | Kaneko ......................... 235/492 |
| 7,760,094 | B1 * | 7/2010 | Kozischek et al. ......... 340/572.1 |
| 7,772,975 | B2 * | 8/2010 | Downie et al. ............. 340/572.1 |
| 7,782,202 | B2 * | 8/2010 | Downie et al. ............. 340/572.1 |
| 7,920,764 | B2 * | 4/2011 | Kewitsch ...................... 385/101 |
| 2007/0069863 | A1 * | 3/2007 | Akiyama et al. ............. 340/10.2 |
| 2010/0316334 | A1 * | 12/2010 | Kewitsch ......................... 385/78 |

OTHER PUBLICATIONS

International Search Report for PCT/US2008/013733, dated Sep. 9, 2009.

* cited by examiner

*Primary Examiner* — Van T. Trieu
(74) *Attorney, Agent, or Firm* — Myers Bigel Sibley & Sajovec

(57) ABSTRACT

Patch panels are provided that include a mounting frame and a plurality of MPO-to-MPO couplers that are mounted on the mounting frame. Each MPO-to-MPO coupler includes a first connector port that is accessible from the front side of the patch panel and a second connector port that is accessible from the rear side of the patch panel. The patch panels also include a first set of antennas, where each antenna from the first set of antennas is adjacent the first connector port of a respective one of the MPO-to-MPO couplers and a second set of antennas, where each antenna from the second set of antennas is adjacent the second connector port of a respective one of the MPO-to-MPO couplers.

12 Claims, 12 Drawing Sheets

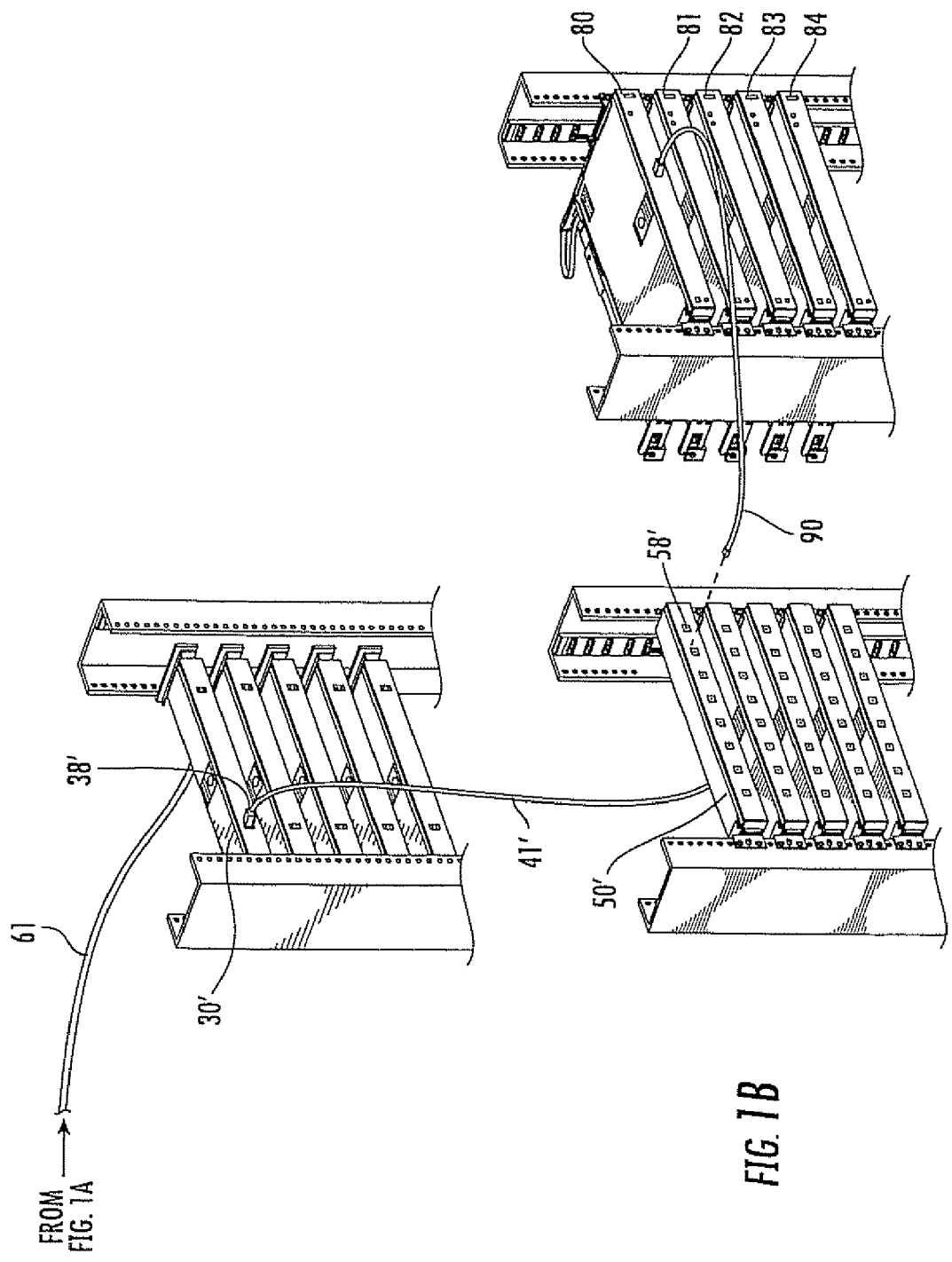

US 8,203,450 B2

INTELLIGENT MPO-TO-MPO PATCH PANELS HAVING CONNECTIVITY TRACKING CAPABILITIES AND RELATED METHODS

FIELD OF THE INVENTION

The present invention relates generally to communications systems and, more particularly, to communications patching systems.

BACKGROUND

A "data center" is a facility that is used to house computer systems and associated components, such as telecommunications equipment and memory storage systems. Data centers are used to, among other things, run the computer-based applications that handle the core business and operational data of one or more organizations. Typically, these applications are run on microcomputers that are typically referred to as servers and, in some instances, on mainframe computers.

Large data center operations may host thousands or even tens of thousands of servers. In many instances, data centers may be configured to provide double or even triple redundancy with respect to power feeds, backup power supplies, communications lines, memory storage and processing, and may have automated back-tip capabilities. Data centers may also have layered network security elements including, for example, firewalls, VPN gateways, intrusion detection systems and the like. Data centers also may include monitoring systems that monitor the networked computer equipment and/or the applications running on the servers.

The expansion of the Internet has led to a growing need for large data center operations. Businesses making sales and/or providing services over the Internet typically require high-speed Internet connectivity, tight information security and non-stop operation. Major Internet-based companies such as large online retailers, Internet portals and search engine companies run large "Internet data centers" that host the thousands of servers and the other computer equipment necessary to provide large numbers of users simultaneous, secure, high-speed, fail-safe access to their web sites. Many small to medium-sized businesses may not have the resources and/or sophistication required to install and maintain the equipment necessary to provide such Internet-based access to their servers. Such businesses may also find it difficult to provide and maintain the highly trained, 24-hour a day staff that are typically necessary to repair or replace defective equipment (e.g., servers, cables, patch cords, computer cards, etc.), add new equipment, update outdated equipment and otherwise run a data center. Thus, to fill this market need, computer equipment makers and others are building and maintaining Internet data centers and then, for a fee, providing data center operations for a large number of businesses.

A data center may occupy one or more rooms or floors of a building, an entire building and/or a multi-building complex. The computer equipment housed in a data center may include, for example, servers, mainframe computers and memory storage devices and backup devices. Data centers also include routers, switches and patching systems that transport traffic between the servers, memory storage devices and the outside world. The computer equipment is often mounted on industry standardized equipment racks which are usually arranged in rows with corridors between them that allow access to the front and rear of each device. Elevated floors may be provided that are constructed of, for example large removable tiles. Cable trays may be installed overhead (including in the ceiling) and/or under the elevated floor. Cables and patch cords (a patch cord is a cable that has a connector on at least one end thereof) that are used to interconnect the equipment in the data center may be run through these cable trays.

In most data center operations, the communications lines used to interconnect the servers, memory storage devices, routers and other computer equipment to each other and to external communication lines are typically run through sophisticated patching systems that may simplify later connectivity changes. FIGS. 1A-1B together are a simplified schematic diagram of the scheme that might be used in a data center to interconnect one particular server (e.g., server 12 in FIG. 1A) to one particular memory storage device (e.g., memory storage device 80 in FIG. 1B).

As shown in FIG. 1A, a plurality of rack-mounted servers 10-14 are connected by individual cables 20-24 (e.g., fiber optic cables) to a rack-mounted patch panel 30. For example, server 12 is connected to patch panel 30 via cable 22. In the example shown in FIG. 1A, each of the cables 20-24 comprise a patch cord, meaning that each end of the cable is terminated with a connector. The patch panel 30 may comprise, for example, a Multi-fiber Push On ("MPO") to single fiber patch panel (herein a "MPO-to-single fiber patch panel") that includes a plurality of single strand connector ports (the single strand connector ports are located on the front side of patch panel 30 and hence are not visible in FIG. 1A) which may comprise, for example, SC fiber optic couplers, and a plurality of multi-strand connector ports 38-39, which may comprise, for example, MPO couplers. Each of the single strand connector ports is configured to receive a single strand fiber optic patch cord, while each of the multi-strand connector ports 38-39 are configured to receive a respective multi-strand fiber optic cable. A MPO-to-single fiber patch panel such as patch panel 30 may be used to aggregate a plurality of single strand fiber optic cables for connection to a multi-strand fiber optic cable and to correspondingly connect each of the strands of a multi-strand fiber optic cable to respective single strand fiber optic cables. Typically (but not always), the patch panel 30 will be located in the general vicinity of the plurality of servers 10-14 so that the individual cables 20-24 may be implemented as relatively short length patch cords. In FIG. 1A, cable 22 is plugged into one of the single strand connector ports (not visible in FIG. 1A) on patch panel 30. The MPO-to-single fiber patch panel 30 couples this single strand connector port that receives cable 22 (among others) to multi-strand connector port 38.

As is also shown in FIG. 1A, a plurality of "backbone" multi-strand fiber optic cables 40-41 are connected to the second set of connector ports 38-39. MPO backbone cables 40-41 that include 12, 24, 36, 72 strands per cable are commonly used. These backbone cables 40-41 are typically routed through the floor and/or ceiling of the data center, and may run for large distances (particularly in data centers that occupy one or more buildings). Each backbone cable 40-41 may include an MPO connector on each end thereof. A second MPO-to-single fiber patch panel 50 may also be provided. As shown in FIG. 1A, the MPO backbone cable (cable 41) that includes the fiber strand that is connected to server 12 connects multi-strand connector port 38 on patch panel 30 to a multi-strand connector port on the second patch panel 50 (the multi-strand connector port is not visible in FIG. 1A as it is located on the reverse side of patch panel 50). A single strand fiber optic cable 60 is plugged into a single strand connector port 57 on the front side of patch panel 50, thereby connecting cable 41 to one of a plurality of switches 70-74 (e.g., switch 70) through patch panel 50 and cable 60. The switch 70 is configured to provide connectivity between the connector port on switch 70 that receives patch cord 60 to another connector port on switch 70 into which a second patch cord 61 is inserted. While only two patch cords 60, 61 are shown connected to switch 70 in order to simplify the drawings, it will be appreciated that in normal operation switch 70 and the various other components and patch panels depicted in FIGS. 1A and 1B would typically have many more patch cords/cables connected thereto.

Continuing now to FIG. 1B, which is a continuation of FIG. 1A, it can be seen that the patch cord 61, which is, for example, an SC patch cord, connects to a single strand connector port on a second rack-mounted MPO-to-single fiber patch panel 30'. The MPO-to-single fiber patch panel 30' provides connectivity between the connector port that receives patch cord 61 and a multi-strand connector port 38'. As shown in FIG. 1B, backbone multi-strand fiber optic cable 41' includes an MPO coupler on each end thereof, and is used to connect connector port 38' of patch panel 30' to a multi-strand connector port on another MPO-to-single fiber patch panel 50'. A single strand fiber optic cable 90 is plugged into a single strand connector port 58' on the front side of the second patch panel 50', thereby connecting cable 41' to one of a plurality of memory storage devices 80-84 (e.g., memory storage device 80) through the second patch panel 50' and the cable 90. Thus, as shown in FIGS. 1A and 1B, the exemplary server 12 is connected to the memory storage device 80 through patch cord 22, one of the single strand connector ports and connector port 38 of the patch panel 30, backbone cable 41, one of the multi-strand connector ports and connector port 57 of patch panel 50, cable 60, two connector ports on switch 70, one of the single strand connector ports and connector port 38' of the patch panel 30', backbone cable 41', one of the multi-strand connector ports and connector port 58' of patch panel 50', and cable 90.

As computer equipment is, for example, added, moved or replaced in a data center, it often becomes necessary to make temporary and/or permanent changes to the interconnection scheme. For example, if a first memory storage device in a data center is scheduled to be replaced with a new memory storage device, servers and other computer equipment that use the first memory storage device may need to be temporarily connected to a second memory storage device until such time as the new memory storage device may be installed, configured, tested and brought online. The patching system depicted in FIGS. 1A and 1B may facilitate making such changes. For example, if a configuration change requires that server 12 be connected to a different memory storage device such as memory storage device 84, this may very simply be accomplished by, for example, plugging patch cord 60 into a different connector port on patch panel 50.

Unfortunately, record-keeping of the patching connections that are necessary to know which patch cord to move are not always 100% accurate. Conventionally, the interconnections of the various patch cords and cables in a data center were logged in a paper or a computer-based log. However, if a technician neglects to update the log each and every time a change is made, and/or makes errors in logging changes, then the paper or computer based logs will no longer be fully accurate. As a result, in some cases, each time a technician needs to change a patch cord, the technician would manually trace that patch cord between two connector points by locating one end of the patch cord and then manually following the patch cord until he/she finds the opposite end of that patch cord.

However, in large scale data center operations the manual tracing of patch cords may be difficult or even impossible given the large number of connections, the cable routing mechanisms that are typically used to keep the cable portions of each patch cord out of the way and neatly routed and the spacing of the equipment. As such, systems for automatically detecting and logging patch cord connections have been proposed such as, for example, the systems disclosed in U.S. Pat. Nos. 6,222,908; 6,784,802; 6,424,710 and 6,968,994.

SUMMARY

Pursuant to embodiments of the present invention, patch panels are provided that include a mounting frame and a plurality of MPO-to-MPO couplers that are mounted on the mounting frame. In these patch panels, each MPO-to-MPO coupler includes a first connector port that is accessible from the front side of the patch panel and a second connector port that is accessible from the rear side of the patch panel. The patch panels also include a first set of antennas, where each antenna from the first set of antennas is adjacent the first connector port of a respective one of the MPO-to-MPO couplers and a second set of antennas, where each antenna from the second set of antennas is adjacent the second connector port of a respective one of the MPO-to-MPO couplers.

These patch panels may also include a first printed circuit board that is mounted on or near the front side of the patch panel and a second printed circuit board that is mounted on or near the rear side of the patch panel. The first and second printed circuit boards may each include a plurality of cut out portions that expose the first and second connector ports. Moreover, first and second sets of sensors may be provided, where a sensor from the first set of sensors is adjacent the first connector port of each respective MPO-to-MPO coupler, and a sensor from the second set of sensors is adjacent the second connector port of each respective MPO-to-MPO coupler. The sensors in the first and second sets of sensors may comprise infrared sources and infrared detectors, respectively.

In some embodiments, these patch panels may also include a first radio frequency identification transceiver on the first printed circuit board and a second radio frequency identification transceiver on the second printed circuit board. The first radio frequency identification transceiver may be coupled to at least some of the first set of antennas, and the second radio frequency identification transceiver may be coupled to at least some of the second set of antennas. A first switching circuit may be coupled between an output of the first radio frequency identification transceiver and the first set of antennas. This first switching circuit may be configured to selectively couple one of the first set of antennas to the output of the first radio frequency identification transceiver. Likewise, a second switching circuit may be coupled between an output of the second radio frequency identification transceiver and the second set of antennas. This second switching circuit may be configured to selectively couple one of the second set of antennas to the output of the second radio frequency identification transceiver. A controller may also be provided that is configured control the first and second radio frequency identification transceivers and the first and second switching circuits.

Pursuant to further embodiments of the present invention, communications systems are provided which include a patch panel that has a mounting frame with an MPO-to-MPO coupler mounted thereon. The MPO coupler includes a first connector port that is accessible from a frontside of the patch panel and a second connector port that is accessible from a rear side of the patch panel. An RFID antenna is mounted on one of the front or rear side of the patch panel. An RFID transceiver is coupled to the RFID antenna. In these communications systems, a first connector of a first communications cable may be inserted within the first connector port, where the first connector includes a first RFID tag. A second connector of a second communications cable may be inserted within the second connector port, where the second connector includes a second RFID tag. The RFID antenna may be configured to receive information transmitted by both the first RFID tag and the second RFID tag.

Pursuant to still further embodiments of the present invention, patch panels may be provided that include a mounting frame, a plurality of connector ports and a plurality of RFID antennas. At least some of the RFID antennas are designed to energize RFID tags that are included on patch cords that are inserted into at least two of the plurality of connector ports. These patch panels further include an RFID transceiver that is configured to be selectively coupled to each of the plurality of RFID antennas. These patch panels may be MPO-to-MPO patch panels. Moreover, the patch panels may also include a controller that is configured to send a command that places an RFID tag into sleep mode after reading an identifier that is transmitted by the RFID tag. In these patch panels, the connector ports may be provided on both the front side and the rear side of the patch panel, and the RFID antennas may be located on only one of the front or rear side of the patch panel. In some embodiments, at least some of the RFID antennas may be designed to energize RAID tags that are included on cables that are inserted into connector ports located on both the front and rear side of the patch panel, and the controller may be configured to determine whether a respective one of the cables is a patch cord that inserted into a front connector port or a backbone cable that is inserted into a rear connector port based on the identification information transmitted by the RFID tag associated with the cable.

Pursuant to yet further embodiments of the present invention, methods of determining a first identifier that is stored in a first RFID tag that is associated with a first cord that is plugged into a patch panel and a second identifier that is stored in a second RFID tag that is associated with a second cord that is plugged into the patch panel are provided in which the first cord is received in a first connector port of the patch panel. A first RFID antenna is used to excite the first RFID tag to determine the first identifier. Thereafter, the first RFID tag is instructed to enter into a sleep mode in which it does not transmit information. The second cord is received in a second connector port of the patch panel. Finally, the first RFID antenna is used to excite the second RFID tag to determine the second identifier.

BRIEF DESCRIPTION OF THE DRAWINGS

FIGS. 1A and 1B are a simplified schematic diagram of a prior art interconnection arrangement for connecting a server to a memory storage device in an Internet data center.

DETAILED DESCRIPTION

Figure 1A:
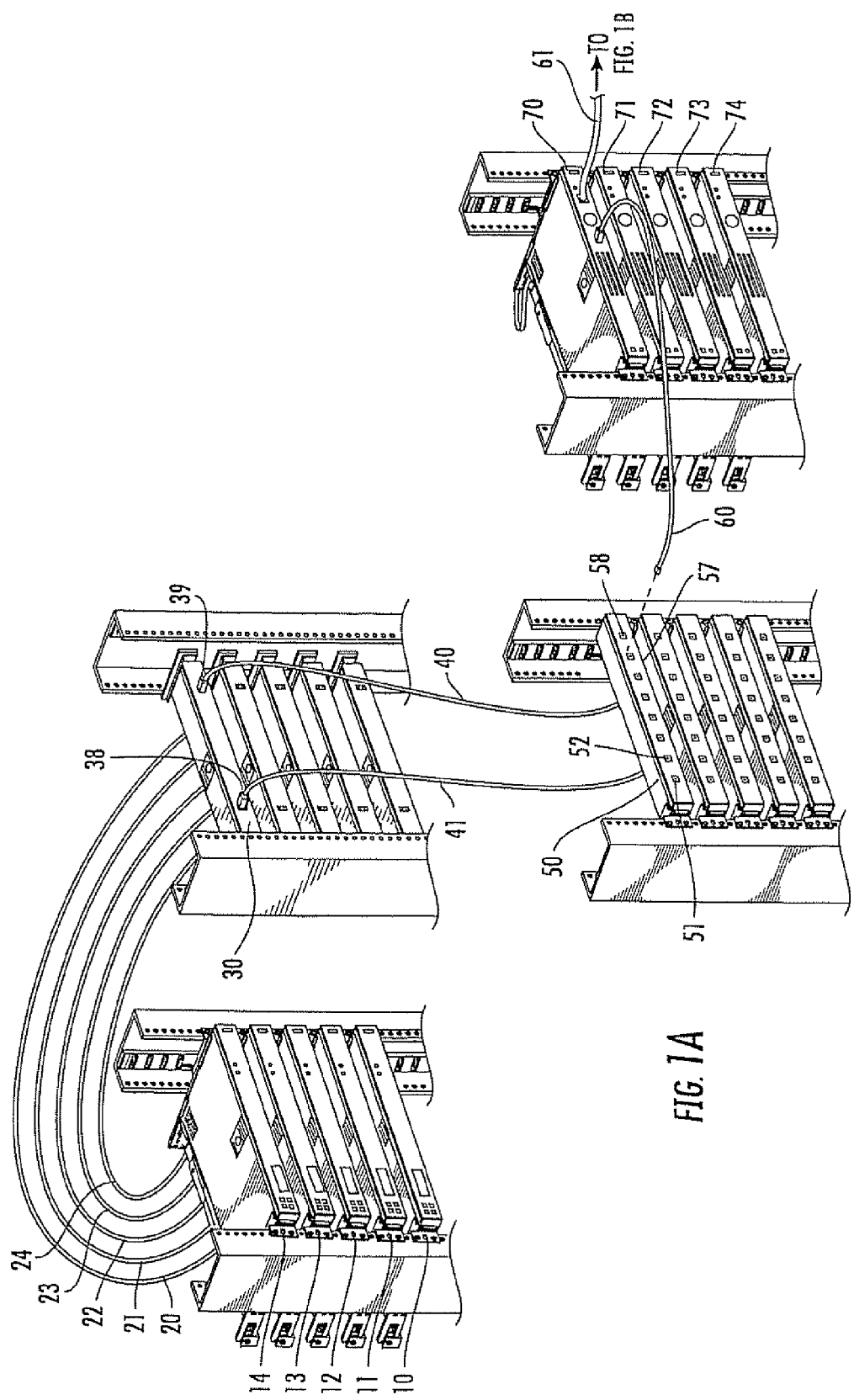

The present invention now is described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

In the drawings, the size of lines and elements may be exaggerated for clarity. It will also be understood that when an element is referred to as being "coupled" to another element, it can be coupled directly to the other element, or intervening elements may also be present. In contrast, when an element is referred to as being "directly coupled" to another element, there are no intervening elements present. Likewise, it will be understood that when an element is referred to as being "connected" or "attached" to another element, it can be directly connected or attached to the other element or intervening elements may also be present. In contrast, when an element is referred to as being "directly connected" or "directly attached" to another element, there are no intervening elements present. The terms "upwardly", "downwardly", "front", "rear" and the like are used herein for the purpose of explanation only.

Unless otherwise defined, all technical and scientific terms used herein have the same meaning as commonly understood by one of ordinary skill in the art to which this invention belongs. The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. As used herein, the term "and/or" includes any and all combinations of one or more of the associated listed items.

Pursuant to embodiments of the present invention, intelligent MPO-to-MPO patch panels are provided. As is known to those of skill in the art, a "patch panel" refers to an interconnect device that includes a plurality of connector ports such as, for example, communications jacks or fiber optic couplers, on at least one side thereof. The patch panel may provide communications paths between each connector port and another of the connector ports and/or a respective one of a plurality of communications cables that may be terminated into some types of patch panels. An MPO-to-MPO patch panel is a patch panel that may be used to directly patch one MPO connector-terminated cable or cord to another MPO connector-terminated cable or cord. The MPO-to-MPO patch panels according to embodiments of the present invention allow equipment such as, for example, storage area network ("SAN") devices, switches or blade servers, that include MPO connector output ports (as opposed to, for example, traditional duplex SC or LC connectors) to be patched directly to MPO-terminated backbone cabling via the MPO-to-MPO patch panel. The MPO-to-MPO patch panels according to embodiments of the present invention may also be used in conjunction with fan-out patch cords that contain a plurality of, for example, LC or SC connectors on one side of the cord and an MPO connector on the other side of the cord to connect equipment that uses traditional duplex SC or LC connectors to other equipment through MPO-terminated backbone cabling. Thus, these MPO-to-MPO patch panels may simplify the patching system in, for example, data centers. Moreover, the MPO-to-MPO patch panels according to embodiments of the present invention may include intelligent patching capabilities that use, for example, a combination of infrared sensors and detectors and radio frequency identification ("RFID") antennas on both the front and back sides or the patch panels to provide complete, real-time, plug presence detection and connectivity tracking for patching connections on both the front and rear sides of the panel.

Figure 2A:
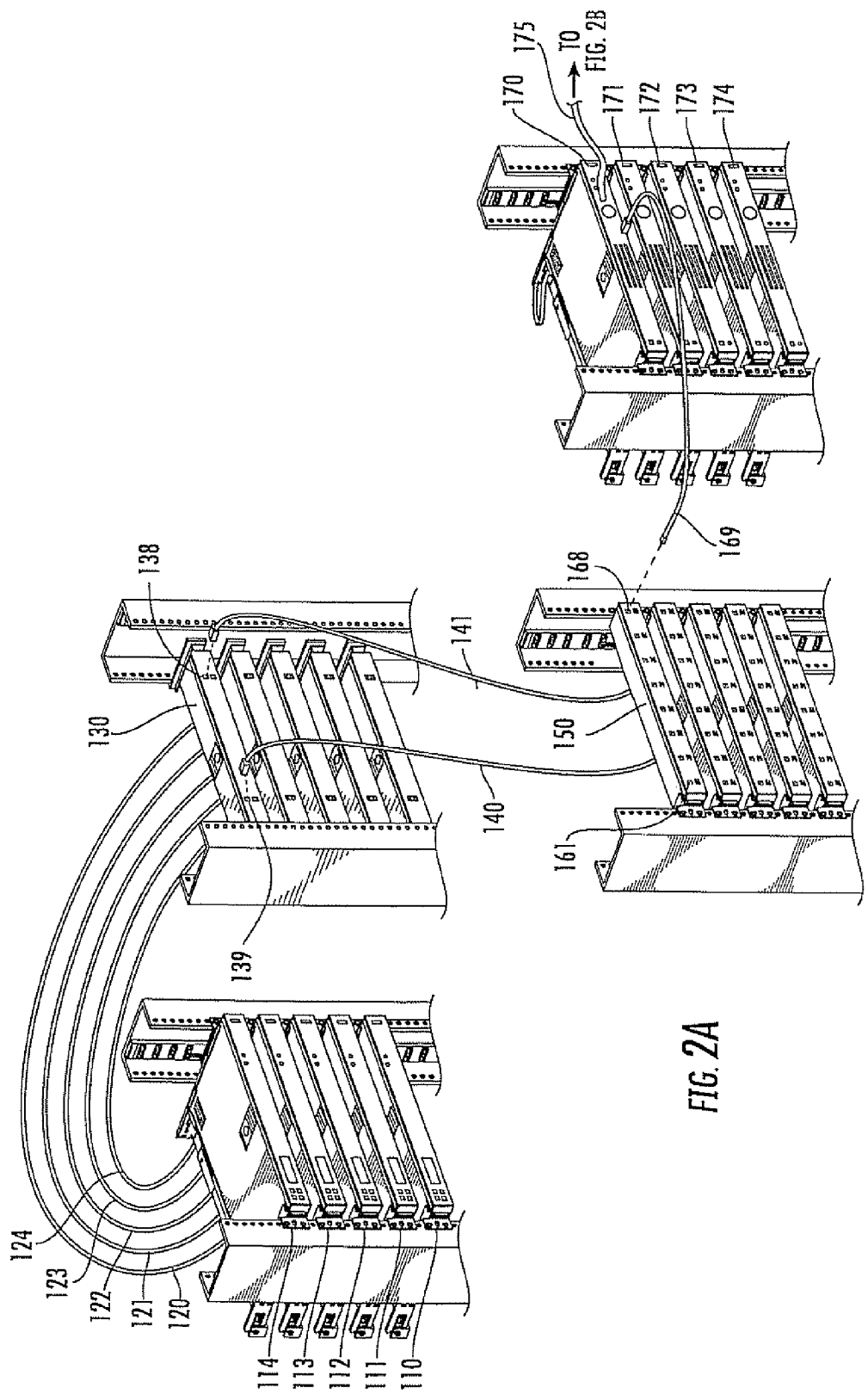
FIGS. 2A and 2B are a schematic diagram of an interconnection scheme for interconnecting computer equipment according to embodiments of the present invention.
Figure 2B:
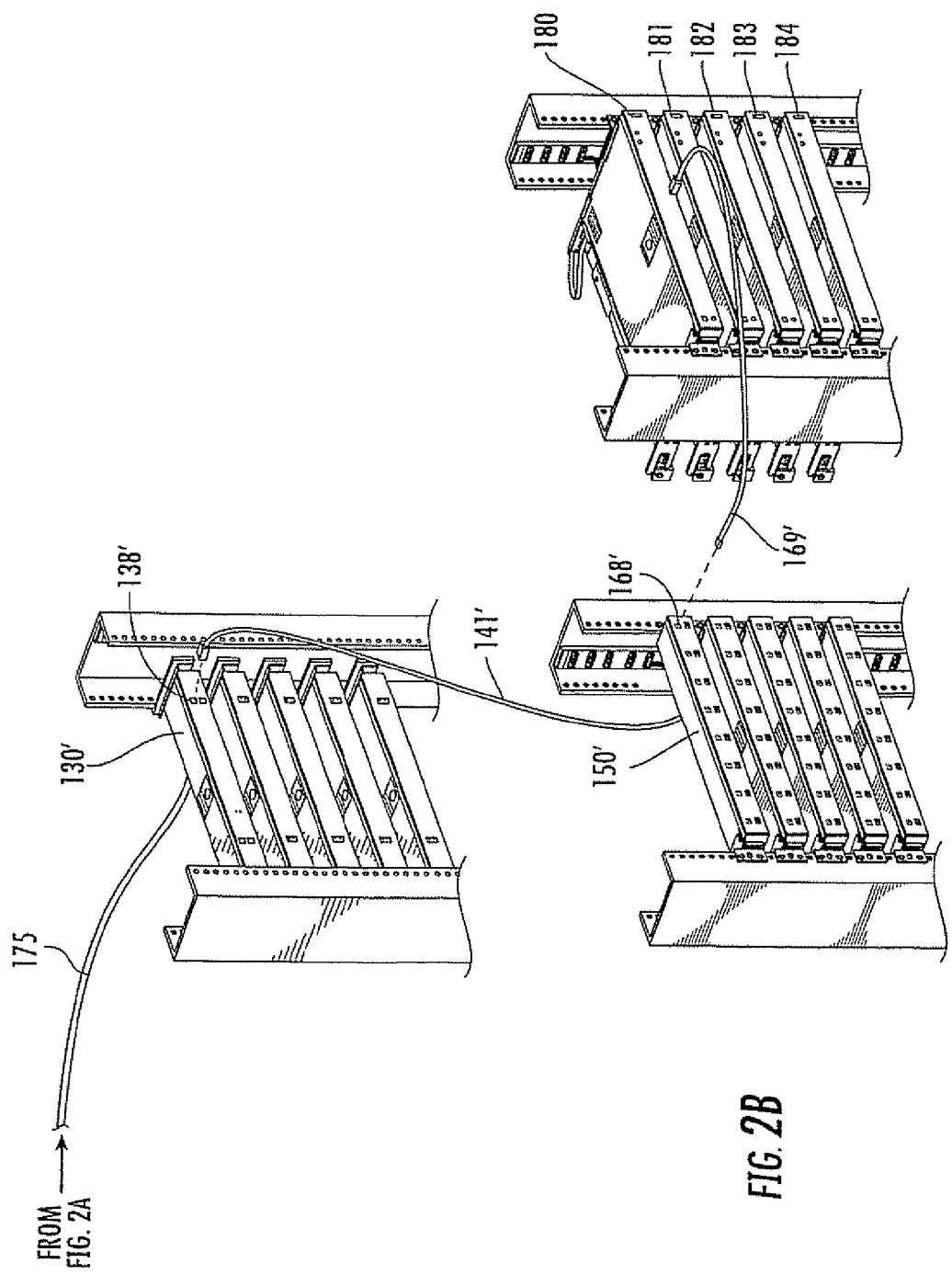

FIGS. 2A and 2B together comprise a schematic diagram illustrating how MPO-to-MPO patch panels according to embodiments of the present invention such as MPO-to-MPO patch panels 130, 150, 150 ' may be used to simplify interconnections between two pieces of equipment (here server 112 and memory storage device 180) in, for example, an Internet data center. As shown in FIG. 2A, a plurality of servers 110-114 are connected by individual patch cords 120-124 (e.g., single strand fiber optic cables) to an MPO-to-single fiber patch panel 130 that includes a plurality of single strand connector ports (the single strand connector ports are not visible in FIG. 2A as they are located on the front side of patch panel 130, which is not visible) and a plurality of multi-strand connector ports 138-139. Here, server 112 is connected to MPO-to-single fiber patch panel 130 by patch cord 122 which is coupled to one of the single strand connector ports (not visible in FIG. 2A). MPO-to-single fiber patch panel 130 couples this single strand connector port (among others) to multi-strand connector port 138.

As is also shown in FIG. 2A, a MPO-to-MPO patch panel 150 is provided. A plurality of backbone multi-strand fiber optic cables 140-141 are used to connect connector ports 138-139 of patch panel 130 to two of the MPO coupler-style connector ports that are located on the rear side of an MPO-to-MPO patch panel 150 (these MPO coupler style connector ports are located on the reverse side of patch panel 150 and hence are not visible in FIG. 2A). Each backbone cable 140-141 include an MPO connector on each end thereof. In the example of FIGS. 2A and 2B, backbone cable 141 connects connector port 138 to one of the MPO coupler-style connector ports on the reverse side of patch panel 150, MPO-to-MPO patch panel 150 may have, for example, the configuration of any of the MPO-to-MPO patch panels according to embodiments of the present invention that are described in the present specification. As shown in FIG. 2A, patch panel 150 also includes a plurality of MPO coupler-style connector ports 161-168 on the front side thereof. Each of the MPO coupler-style connector ports on the reverse side of patch panel 150 is connected to and/or abuts a respective one of the MPG coupler-style connector ports 161-168 so that the strands of any MPO connector terminated multi-strand fiber optic cable plugged into one of the MPO coupler-style connector ports on the reverse side of patch panel 150 will be aligned with the strands of a MPO connector terminated multi-strand fiber optic cable that is plugged into the corresponding one of ports 161-168 so as to make optical connections between the strands of such respective cables. An MPO patch cord 169 connects connector port 168 on the front side of the MPG-to-MPO patch panel 150 (which for purposes of this example, is the connector port that is aligned with the connector port on the rear side of patch panel 150 that receives patch cord 141) to a switch 170 that is configured to receive MPO patch cords.

Continuing now to FIG. 2B, which is a continuation of FIG. 2A, it can be seen that the patch cord 175, which is, in this embodiment, an MPO patch cord, connects to a multi-strand connector port on a second rack-mounted MPO-to-MPO patch panel 130' (the connector port on the front side of patch panel 130' that is aligned with connector port 138'). As shown in FIG. 2B, MPO backbone cable 141' is used to connect connector port 138' of patch panel 130' to a multi-strand connector port on another MPO-to-MPO patch panel 150'. An MPO patch cord 1691 is plugged into a multi-strand connector port 168' on the front side of the second patch panel 150', thereby connecting cable 141' to one of a plurality of memory storage devices 180-184 (e.g., memory storage device 180) through the second patch panel 150' and the cable 169'. Thus, as shown in FIGS. 2A and 2B, the exemplary server 112 is connected to the memory storage device 180 through patch cord 122, patch panel 130, backbone cable 141, patch panel 150, cable 169, switch 170, patch panel 130', backbone cable 141', patch panel 150', and cable 169'. While in the example if FIGS. 2A and 2B patch panel 130 is an MPO-to-single fiber patch panel and patch panels 130', 150', 150' are MPO-to-MPO patch panels, it will be appreciated that the type of patch panels used may vary depending on the particular equipment configuration. For example, if switch 170 has single strand connector ports, then patch panels 130' and 150 may be implemented as MPO-to-single fiber patch panels. Thus, it will be appreciated that FIGS. 2A and 2B are not limiting, but merely show one exemplary environment in which MPO-to-MPO patch panels according to embodiments of the present invention may be used.

Figure 3:
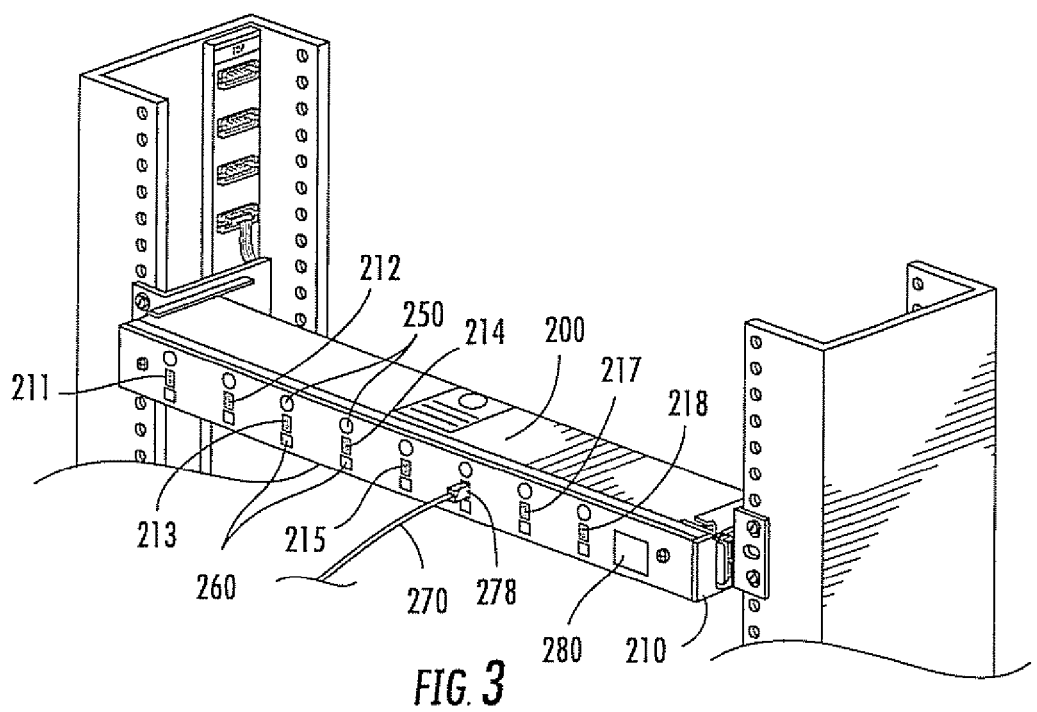
FIG. 3 is a perspective view of an MPO-to-MPO patch panel according to certain embodiments of the present invention.
Figure 3A:
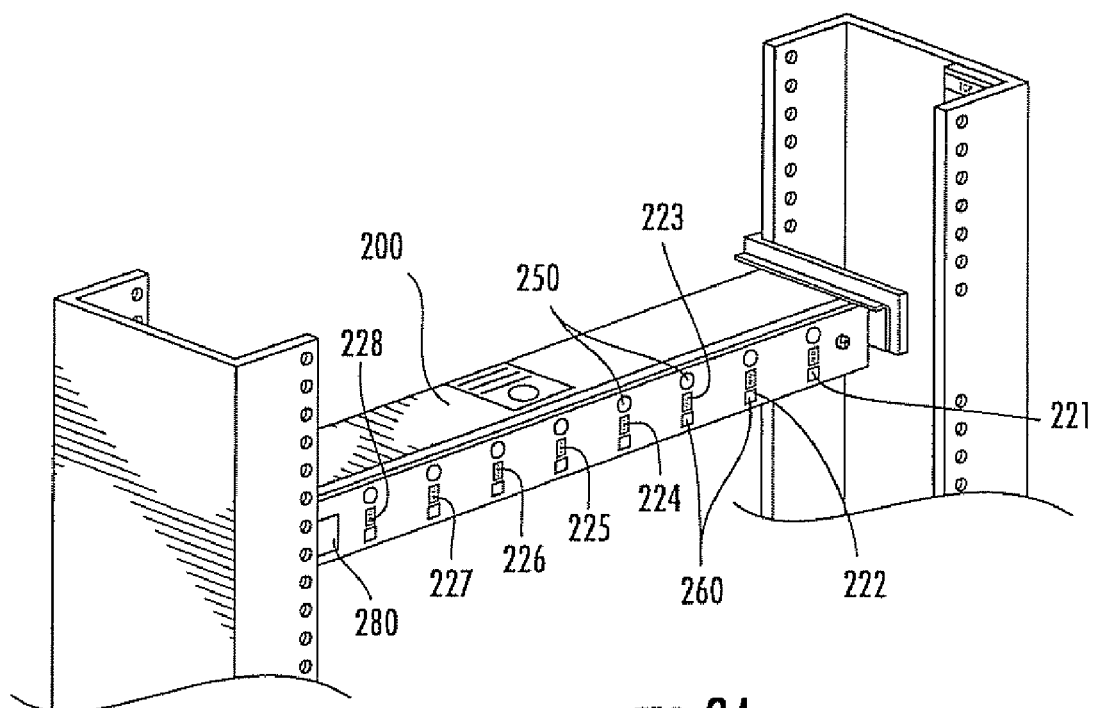
FIG. 3A is a perspective view of the back side of the MPO-to-MPO patch panel of FIG. 3.

FIG. 3 is a perspective view of an MPO-to-MPO patch panel 200 according to certain embodiments of the present invention. FIG. 3A is a perspective view of the reverse side of the MPO-to-MPO patch panel 200. The MPO-to-MPO patch panel 200 may be used, for example, as the MPO-to-MPO patch panels 150, 150; of FIGS. 2A and 2B. As shown in FIGS. 3 and 3A, the MPO-to-MPO patch panel 200 includes a mounting frame 210. A plurality of MPO coupler-style connector ports 211-218 are provided on a front side of the patch panel 200, and a plurality of MPO coupler-style connector ports 221-228 are provided on the reverse side thereof.

Each of the MPO coupler-style connector ports 211-218 is connected to and/or abuts a respective one of the MPO coupler-style connector ports 221-228 so that the strands of any MPO connector terminated multi-strand fiber optic cable plugged into one of ports 211-218 will be aligned with the strands of a MPO connector terminated multi-strand fiber optic cable that is plugged into the corresponding one of ports 221-228 so as to make optical connections between the strands of such respective cables. Typically, each pair of connector ports (e.g., 211, 221 is implemented as a one piece unit having connector ports on each thereof that is typically referred to as an "MPO-to-MPO coupler" or as simply an "MPO coupler"). However, it will be appreciated that the MPO coupler may be implemented as a multiple piece unit, and that the pieces of such a multiple piece MPO coupler need not all be in direct contact with each other. Each of the MPO couplers are connected to the mounting frame 210 so that the first connector port of each MPO coupler is accessible from the front side of the patch panel, and the second connector port of each MPO coupler is accessible from the rear side of the patch panel. Moreover, while the particular embodiment of the patch panel 200 illustrated in FIGS. 3 and 3A includes eight (8) such MPO couplers, it will be appreciated that more or less MPO couplers could be included on the patch panel 200. An MPO patch cord 270 that is plugged into connector port 216 is also shown in FIG. 3.

The MPO-to-MPO patch panel 200 further includes a plurality of first sensors 250. The first sensors 250 may be any type of sensor including, but not limited to, mechanical sensors (e.g., mechanical switches), reed switches, passive optical-based sensors, light emitting diodes (LEDs) coupled with photodiodes, and electrical based sensors. A first sensor 250 is provided adjacent each of the MPO coupler-style connector ports 211-218 and 221-228. Each of the first sensors 250 is configured to detect when the connector on an MPO-connector terminated cable (i.e., an MPO patch cord) is inserted within, or removed from, the respective MPO coupler-style connector port 211-218 and 221-228 that is associated with the first sensor 250. A controller 280 such as, for example, a printed circuit board mountable microcontroller, is in communication with each sensor 250. The controller 280 is configured to automatically monitor and log interconnections of MPO-connector terminated cables with the MPO coupler-style connector ports 211-218 and 221-228. The controller 280 may include and/or be connected to a database 285 and/or to a user interface 290 that allows a system operator to make queries and receive information back as to the connection status of each of the MPO coupler-style connector ports 211-218 and 221-228.

As is also shown in FIGS. 3 and 3A, the MPO-to-MPO patch panel 200 may further include a plurality of second sensors 260. Each second sensor 260 is configured to read an identifier 278 that is included in or on the MPO-connector terminated cable (such as MPO patch cord 270) that is inserted within a respective one of the MPO coupler-style connector ports 211-218 and 221-228. For example, as the MPO-connector on MPO patch cord 270 passes into connector port 216, the identifier 278 that is included in or on MPO patch cord 270 is read by the second sensor 260 that is associated with connector port 216. The second sensor 260 and the identifier 278 have matched technologies. For example, if the identifier 278 is a UPC bar code, the second sensor 260 may be a bar code reader. As another example, if the identifier 278 is a magnetic medium, the second sensor 260 may be a magnetic head that reads the magnetic medium. If the identifier 278 is data recorded in an optical medium, the second sensor 260 may be a laser reader. As yet another example, if the identifier 278 comprises a microchip, the second sensor 260 may be an electronic circuit that interconnects with the microchip when the MPO-connector is inserted into connector port 216.

Upon reading an identifier 278, the second sensor 260 passes the identifier 278 to the controller 280. Thus, the controller 280, in conjunction with the first sensors 250 and the second sensors 260, may determine when MPO-connector terminated cables are inserted into, or removed from each of the connector ports 211-218 and 221-228 of patch panel 200, and may also identify the unique identifier that is associated with any MPO-connector terminated cable that is inserted into the respective connector ports. This information may be used to track the interconnections on patch panel 200. Moreover, by having controller 280 track interconnections on more than one patch panel, or by combining interconnection information that is tracked for a plurality of patch panels, system-wide tracking of interconnections may be accomplished.

Figure 4:
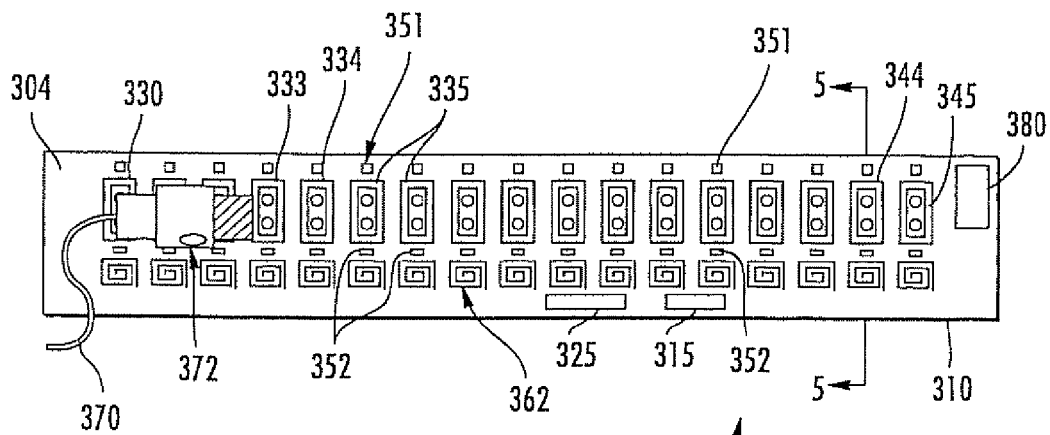
FIG. 4 is a front view of an MPO-to-MPO patch panel according to further embodiments of the present invention.
Figure 5:
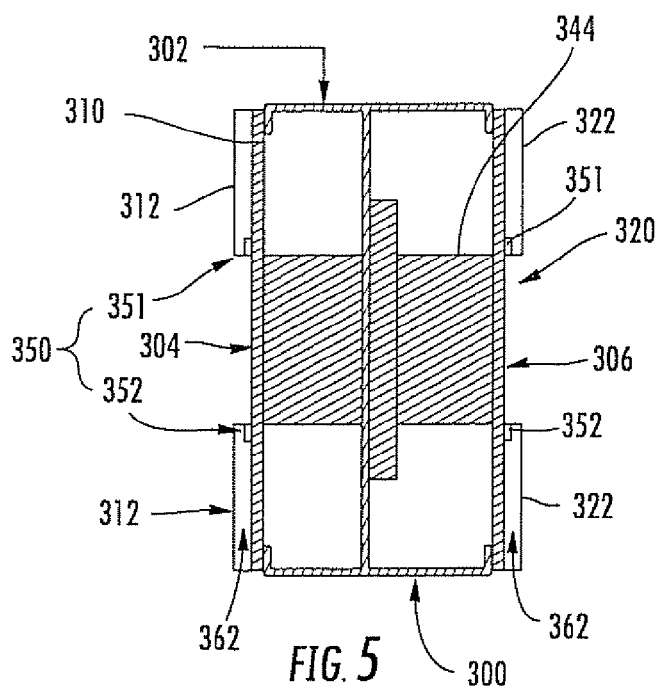
FIG. 5 is cross-sectional diagram taken along the line 5-5 of FIG. 4.
Figure 6:
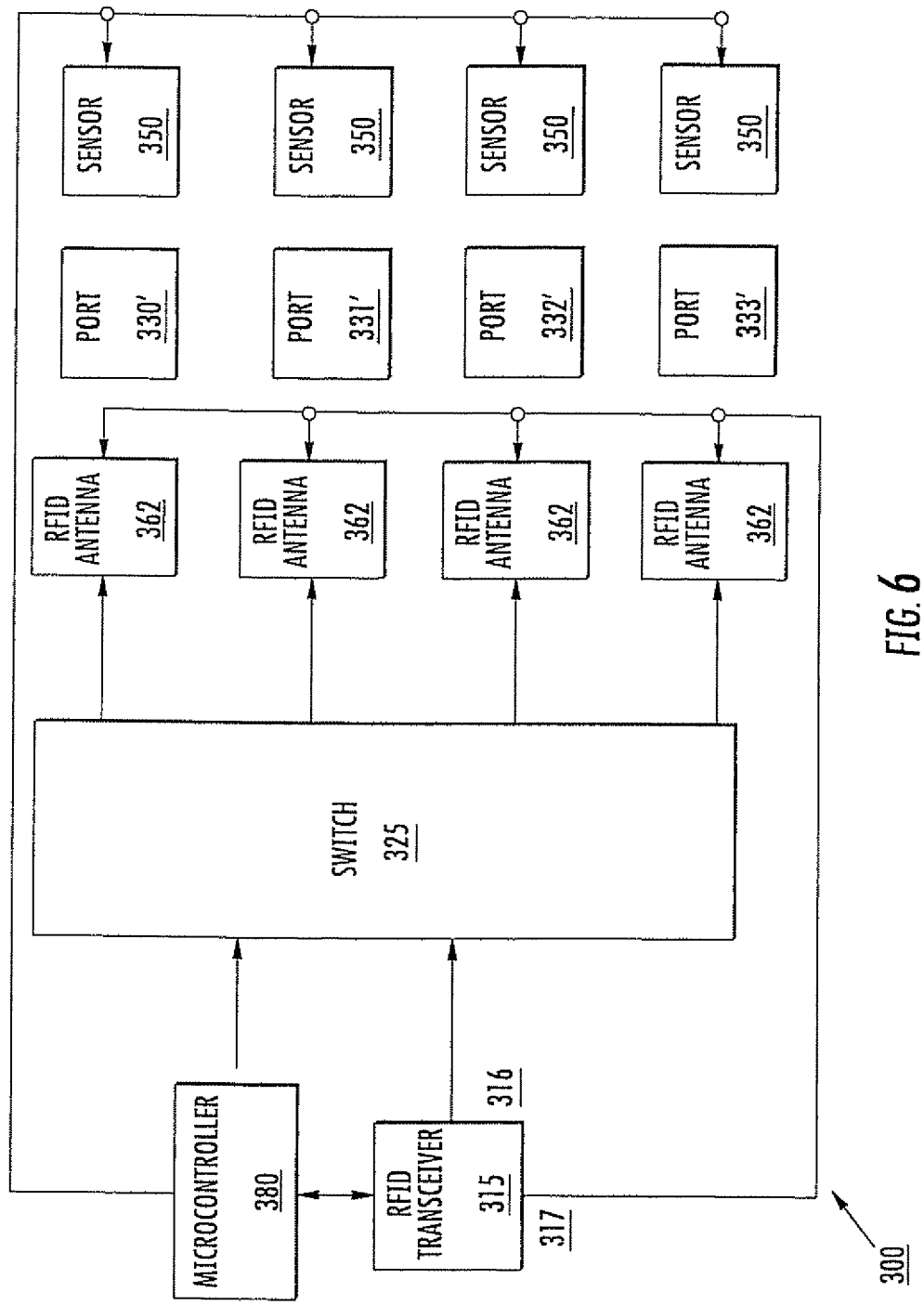
FIG. 6 is a block diagram of the MPO-to-MPO patch panel of FIG. 4.

FIGS. 4 and 5 are front and cross-sectional views, respectively, of an MPO-to-MPO patch panel 300, with the cross-section of FIG. 5 taken along the line 5-5 of FIG. 4. The MPO-to-MPO patch panel 300 may be used, for example, as the MPO-to-MPO patch panel 150 of FIG. 2A. FIG. 6 is a block diagram of selected portions of the MPO-to-MPO patch panel 300. Discussion of the patch panel 300 will first be provided with respect to FIGS. 4 and 5.

As shown in FIGS. 4 and 5, the MPO-to-MPO patch panel 300 includes a mounting frame 302. A first printed circuit board 310 is mounted on the front side 304 of the panel 300, and a second printed circuit board 320 is mounted on the rear side 306 of the panel 300. A plurality of MPO couplers 330-345 are mounted on the mounting frame 302 between the first and second printed circuit boards 310, 320. Respective overlays 312, 327 cover and protect the printed circuit boards 310, 320.

In the embodiment depicted in FIGS. 4 and 5, the printed circuit boards 310, 320 are approximately the same size as the respective front and rear faces of the patch panel 300, and each include a plurality of apertures that provide access to the respective ends of the MPO couplers 330-345. It will be appreciated, however, that in other embodiments the printed circuit boards 310, 320 may be, for example, smaller than the respective front and rear faces of the patch panel 300 (e.g., only located below the MPO couplers 330-345), may not include apertures, may each be implemented as a plurality of smaller printed circuit boards, etc.

The MPO-to-MPO patch panel 300 further includes a plurality of first sensors 350. As shown in FIGS. 4 and 5, in this particular embodiment, each first sensor 350 comprises an infrared source 351 that is positioned on one side of one of the connector ports of the MPO coupler 330-345 and an infrared detector 352 that is positioned on the opposite side of the same connector port of the MPO coupler 330-345. The infrared source 351 and the infrared detector 352 are arranged so that there is a clear line-of sight path therebetween. When no MPO-connector terminated cable is present within, for example, the front connector port of MPO coupler 344, the infrared detector 352 of the first sensor 350 associated with this connector port of MPO coupler 344 receives infrared light emitted from its corresponding infrared source 351. However, when an MPO-connector terminated cable is inserted into the front connector port of MPO coupler 344, the MPO-connector terminated cable obstructs the line-of-sight path between the infrared source 351 and the infrared detector 352. Thus, the reading on each infrared detector 352 indicates whether or not an MPO-connector terminated cable (i.e., an MPO patch cord) is plugged into the connector port of MPO couplers 330-345 with which each particular infrared detector 352 is associated.

As shown in FIG. 4, a first sensor 350 (i.e., an infrared source 351 and an infrared detector 352) is provided adjacent each of the MPO couplers 330-345. A controller 380 that, in this embodiment is mounted on printed circuit board 310, is in communication with each first sensor 350. As an MPO-connector terminated cable is inserted within, for example, the front connector port of MPO coupler 344, the presence of the MPO-connector terminated cable is detected by the change in the reading on the infrared detector 352 that is associated with the front connector port of MPO coupler 344. This presence information is communicated to the controller 380. Similarly, when MPO-connector terminated cable is removed from, for example, the front connector port of MPO coupler 344, the absence of the MPO-connector terminated cable is detected by the change in the reading on the infrared detector 352 that is associated with the front connector port of MPO coupler 344 and read to the controller 380. In some embodiments, the controller 380 may poll the infrared detectors 352 at regular intervals in order to detect changes in the outputs of the infrared detectors 352 that indicate that a MPO-connector terminated cord/cable may have been plugged into, or removed from, a connector port of one of the MPO couplers 330-345. The controller 380 is therefore capable of automatically determining when MPO-connector terminated cable has been added or removed from any MPO coupler 330-345.

The MPO-to-MPO patch panel 300 may further include a plurality of second sensors 362. A second sensor 362 is provided for each connector port of each of the MPO couplers 330-345 (i.e., a total of thirty-two sensors in this example). Each second sensor 362 is configured to read an identifier 378 that is included in or on an MPO-connector terminated cable that is inserted in the connector port of the MPO coupler 330-345 with which the sensor 362 is associated. In this particular embodiment, each second sensor 362 is implemented on the printed circuit board 310 or the printed circuit board 320, directly below a connector port of a respective one of the MPO couplers 330-345. As the MPO-connector on, for example, an MPO patch cord 370 passes into, for example, the front connector port of MPO coupler 344, the identifier 378 that is included in the connector on MPO patch cord 370 passes directly above the second sensor 362 that is associated with the front connector port of MPO coupler 344 where it can be read by second sensor 362.

In patch panel 300, the second sensors are implemented using RFID technology. As is known to those of skill in the art, RFID technology operates by including "RFID tags" on each of a plurality of objects that are to be tracked. Each RFID tag may be implemented as the combination of an antenna and a microchip which is configured to store various information, including a unique identifier. An RFID transceiver and one or more RFID antennas may be used to read the unique identifiers of RFID tags which pass within a certain distance of the RFID antenna(s). In particular, the RFID transceiver transmits a radio frequency ("RF") signal via the RFID antenna(s) such as, for example, an alternating current signal of fixed amplitude and frequency. The frequency of this RF signal is matched to the resonance frequency of the RFID tags that are to be read. The antenna on the RFID tag receives the RE signal, and the RF signal acts to energize the RFID tag. Once energized, the RFID tag transmits information back to the RFID transceiver by altering the load placed by the RFID tag on the RE signal that is transmitted by the RFID antenna. This variation in load causes the amplitude of the RF signal to vary over time. The information transmitted by the RFID tag to the RFID transceiver includes the unique identifier that is stored in the memory of the RFID tag. The RFID transceiver detects these variations in the amplitude of the RE broadcast signals demodulates them, and converts them from an analog signal to a digital signal to determine the unique identifier stored in the energized RFID tag.

As shown in FIGS. 4-5, each second sensor 362 comprises an RFID antenna 362. An RFID antenna 362 is mounted on patch panel 300 adjacent each connector port of each respective MPO coupler 330-345. The RFID antennas 362 may be mounted to the patch panel 300 in various ways (e.g., adhesively attached, attached via fasteners, implemented on and/or within a printed circuit board, etc.). In the illustrated embodiment, the RFID antennas 362 are implemented within the printed circuit boards 310, 320, as will be discussed in more detail with respect to FIGS. 7A and 7B. Each RFID antenna 362 may be designed to have a very small emission field such that signals transmitted by the antenna will only be received by RFID tags that are inserted into the connector port of the MPO coupler 330-345 associated with each respective RFID antenna 362, and will not be received by RFID tags inserted into the other connector port of the MPO coupler, or into the connector ports of any other MPO couplers, on the patch panel 300.

Figure 10:
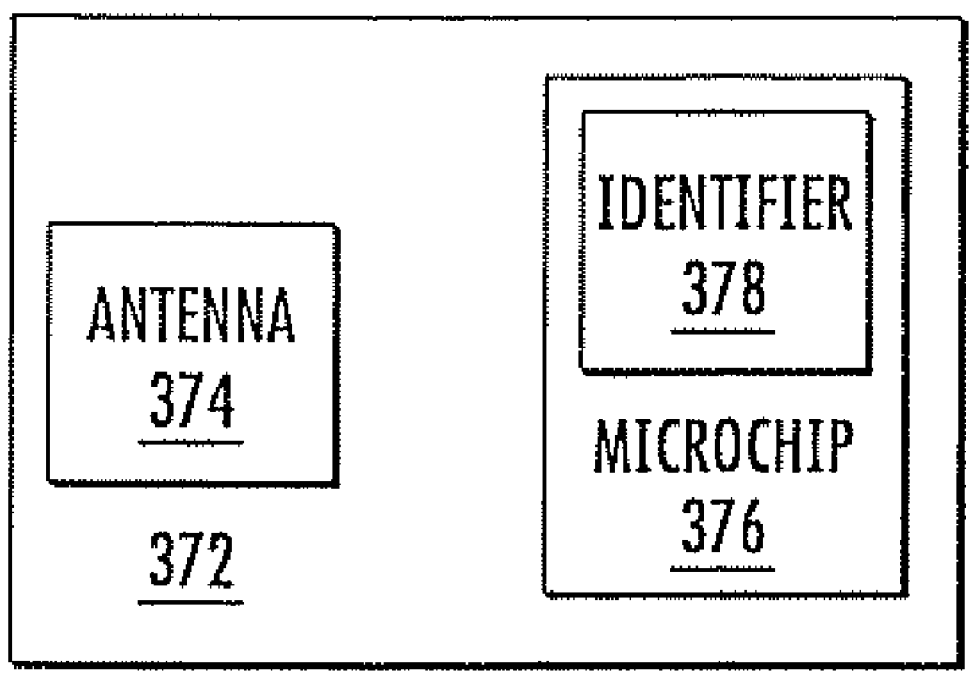
FIG. 10 is a block diagram of an RFID tag that may be used in embodiments of the present invention.

For illustrative purposes, a single MPO patch cord 370 is illustrated in FIG. 4. The MPO connector on each end of the patch cord 370 includes an RFID tag 372 (only one end of patch cord 370 is shown in FIG. 4). As shown in FIG. 10, each RFID tag 372 includes an antenna 374 and a microchip 376 which is configured to store the unique identifier 378. The two RFID tags 372 on an MPO patch cord or cable will generally store the same unique identifier 378. This identifier 378, however, will be different from the identifiers assigned to other cables. The RFID tags 372 can be factory installed on the cables or, alternatively, can be retrofitted on cables in the field. When RFID tags 372 are factory installed, they can be programmed, for example, with information such as manufacturing date, operator's ID, factory code, serial numbers, etc. in addition to the unique identifier 378. If an RFID tag 372 has read/write capabilities, then additional information (e.g., performance test data) could be added to the RFID tag 372 in the field.

As discussed above, each RFID antenna 362 is configured to activate and read information from any RFID tag 372 that is positioned within the connector port of the MPO coupler 330-345 that the RFID antenna 362 is associated with. In particular, any RFID tag 372 that is plugged into the connector port of the coupler at issue draws energy from an RF field created by the RFID antenna 362 when the RFID antenna 362 is activated. The RFID tag 372 uses this energy to power the circuits of its microchip to thereby transfer information stored therein, which is then detected by the RFID antenna 362.

Further discussion of the patch panel 300 will now be provided with reference to FIG. 6. As noted above, the block diagram of FIG. 6 only depicts a portion of the patch panel 300 in that it only illustrates the front connector ports 330'-333' of MPO couplers 330-333, and the sensors 350, 362 that are associated with those connector ports. The remaining front connector ports 334'-345' of MPO couplers 334-345, the back connector ports 330"-345" of MPO couplers 330-345 and the sensors 350, 362 associated with these additional connector ports are not illustrated in FIG. 6 in order to simplify the block diagram.

As shown in FIG. 6, the patch panel 300 includes an RFID transceiver 315 and a switching circuit 325. The RFID transceiver 315 may comprise, for example, a Philips HTRC110 integrated circuit chip that produces a 125 kHz differential alternating current output waveform on first and second outputs. The Philips HTRC110 integrated circuit chip is a commercially available integrated circuit that may be mounted on a printed circuit board (e.g., printed circuit board 310 or 320 of FIGS. 4 and 5). Each RFID antenna 362 has two inputs. As shown in FIG. 6, a first output port 316 of transceiver 315 is coupled to an input port or terminal of switch 325. The switch 325 may be any switch circuit, multiplexer or the like that selectively couples the RFID transceiver 315 to respective ones of the RFID antennas 362. The switch 325 has a plurality of outputs, each of which are coupled to one of the input ports on each of the RFID antennas 362. The second output port 317 of transceiver 315 is coupled to the other input port on each RFID antenna 362.

As is further shown in FIG. 6, the controller 380 may be implemented as a microcontroller. This microcontroller 380 may be mounted, for example, on printed circuit board 310 or 320. In one specific embodiment of the present invention, the controller may be implemented using a PIC16F886 series chip. In addition to tracking patch cord interconnection information, the microcontroller 380 may also control and monitor the RFID transceiver 315, the switch 325, the RFID antennas 362 and the sensors 350. The microcontroller 380 may also be in communication with a rack manager and/or system manager, as will be discussed in more detail herein with respect to FIG. 8. As shown in FIG. 4, the microcontroller 380 may be mounted under the overlay 312.

The patch panel 300 of FIGS. 4-6 may operate as follows. In order to identify the connectivity of the patch cords/cables that are plugged into patch panel 300, the microcontroller 380 provides control signals that configure switch 325 to connect output port 316 of RFID transceiver 315 to a specific one of the RFID antennas 362. The microcontroller 380 also sends a control signal to the RFID transceiver 315 that causes the RFID transceiver 315 to generate and transmit a differential signal on outputs 316, 317. This differential signal is passed to the RFID antenna 362 that is selected by switch 325, and is transmitted by that antenna 362. If a patch cord 370 that includes an RFID tag 372 is inserted into the connector port associated with the transmitting RFID antenna 362, that RFID tag 372 will be excited by the field emitted by the transmitting RFID antenna 362, and the RFID tag 372 will then transmit the unique identifier 378 that is stored in a memory of the RFID tag 372. The signal that is transmitted by the RFID tag 372 is received by the RFID antenna 362 and passed through switch 325 to the RFID transceiver 315 where it is demodulated and converted from an analog signal to a digital signal. The RFID transceiver 315 passes this digital signal to the microcontroller 380 which then determines the unique identifier 378 that is included in the information sent from the RFID tag 372. This unique identifier 378 may then, for example, be passed to a rack manager or system manager, stored in a database or other storage means and/or displayed on a monitor. The microcontroller 380 may be included in or connected to a database 385 and/or to a user interface 390 (not depicted in FIG. 6) that allows a system operator to make queries and receive information back as to the connection status of each connector port of the MPO couplers 330-345.

After a period of time, the microcontroller 380 may change the control signal(s) that are provided to the switch 325 so as to connect the RFID transceiver 315 to a different one of the RFID antennas 362. Operations will then be repeated as explained above with this new connectivity in order to identify the unique identifier 378 associated with any RFID tag 372 of any MPO connector terminated cord/cable that is plugged into the connector port associated with the RFID antenna 362 that is now connected to the RFID transceiver 315. Operations may continue until each of the RFID antennas 362 has been serially connected to the RFID transceiver 315 in order to identify the unique identifier 378 associated with the RFID tag 372, if any, of the patch cord connector, if any, that is plugged into the connector port associated with the RFID antenna 362 that is connected to the RFID transceiver 315.

While the above description of the operation of the patch panel 300 explains how the RFID antennas 362 may be used to regularly poll the connector ports MPO couplers 330-345 to detect the unique identifier stored on the RFID tag of any cable/cord that is plugged into these connector ports, it will be appreciated that the RFID antennas 362 may alternatively and/or additionally be energized to detect the unique identifier stored on the RFID tag of any cable/cord that is plugged into a specific connector port of a specific MPO coupler in response to the first sensor 350 that is associated with that specific connector port detecting that a cord/cable had been plugged into the connector port (or removed therefrom).

While FIG. 6 illustrates the patch panel 300 as including a single RFID transceiver 315 and a single microcontroller 380, it will be appreciated that more than one RFID transceiver and more than one controller may be provided per panel. For example, in some embodiments, a separate RFID transceiver 315 and a separate controller 380 could be provided on each of printed circuit boards 310, 320. It will likewise be appreciated that in other embodiments an RFID transceiver 315 and a controller 380 may be shared by multiple patch panels. The controller 380 may be directly connected, collected through a printed circuit board, wirelessly connected, etc. to the RFID transceiver 315 and switch 325. The controller 380 may comprise, for example, virtually any type of processor, such as an 8-bit processor, and may retain a history of events within memory. Multiple controllers/processors may be provided which together perform each of the operations of the controller 380 depicted in the illustrated embodiment of FIGS. 4-6. The controller 380 may be associated with a rack controller or other device/software that controls the various functions/operations of the plurality of patch panels.

It will likewise be appreciated that the switch 325 may be implemented in a variety of ways including, for example, each of the ways disclosed in co-pending and commonly assigned U.S. patent application Ser. No. 11/871,448, filed Oct. 12, 2007, the entire contents of which are incorporated by reference herein as if set forth fully. One switch per panel or per printed circuit board 310, 320 may be provided, or multiple switches may be provided per printed circuit board 310, 320. The terran "switch" is used herein to refer to any switch circuit or multiplexing device that may be used to selectively connect one device to one of a plurality of other devices.

Figure 7B:
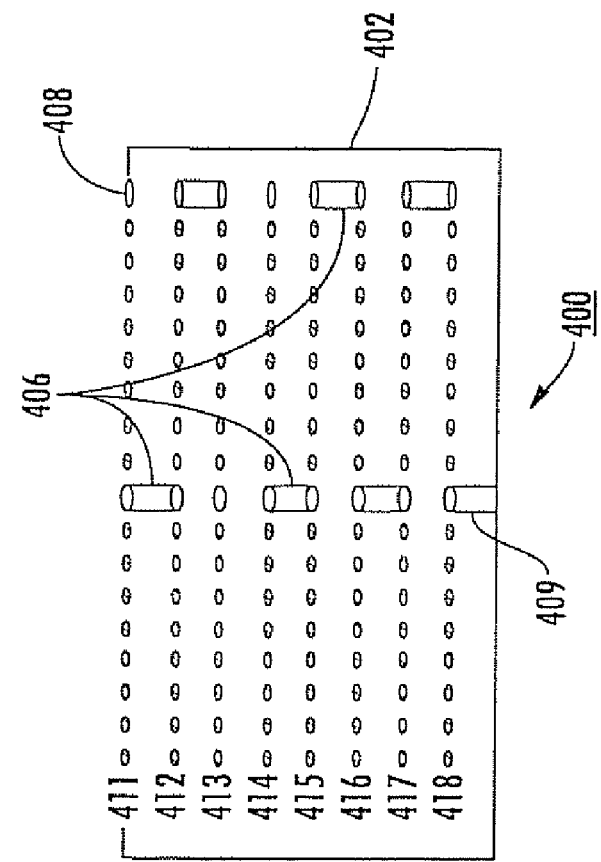
FIGS. 7A and 7B are, respectively, a plan view and a cross-sectional view of an RFID antenna according to certain embodiments of the present invention.
Figure 7A:
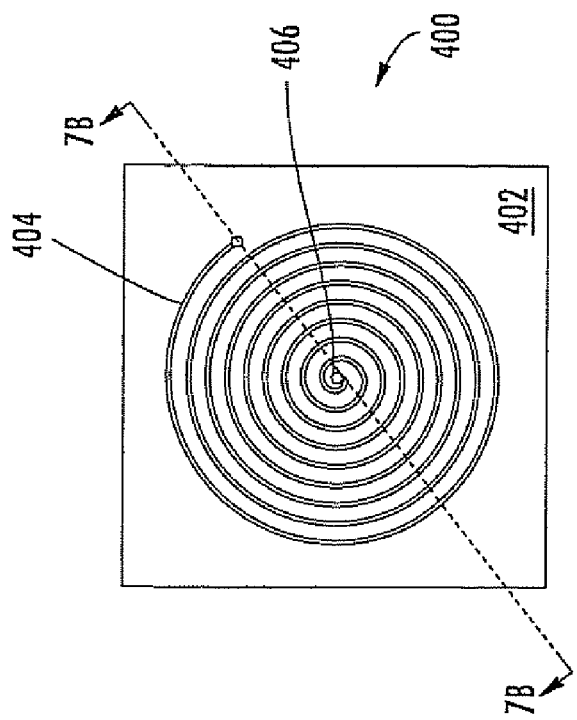

In certain embodiments of the present invention, the RFID antennas 362 may be implemented by etching a set of compact, densely spiraled conductive traces on, for example, a multi-layer printed circuit board. FIG. 7A is a plan view of one such embodiment of an RFID antenna 400. FIG. 7B is a cross-sectional view of the RFID antenna 400 taken along the line 7B-7B of FIG. 7A. As shown in FIGS. 7A and 7B, the RFID antenna 400 is implemented as a copper trace pattern 404 that is deposited on a multi-layer printed circuit board 402. As shown best in FIG. 7B, in this particular embodiment, antenna 400 is implemented on eight layers of printed circuit board 402, which are labelled layers 411-418 in FIGS. 7A and 7B. The printed circuit board 402 may have additional layers in which other circuitry is located. As shown in FIG. 7A, the portion of the copper trace pattern 404 that is provided on the uppermost layer 411 of the printed circuit board 402 is in a generally spiral pattern. In some embodiments, the portion of the copper trace pattern 404 that is provided on each additional layer 412-418 or printed circuit board 402 may have a similar or the same spiral pattern as portion on the uppermost layer 411. As shown best in FIG. 7B, conductive through holes such as metal-filled vias 406 may connect the portions of the copper trace pattern 404 on a first layer to the portion of the copper trace pattern 404 on an adjacent layer. In this particular embodiment, a first input 408 to the RFID antenna 400 is an end of the copper trace pattern 404 on layer 411 of the printed circuit board 402, and a second input 409 is the end of a metal-plated via 406 that extends through layer 418 of printed circuit board 402. While FIGS. 7A and 7B depict one possible embodiment of an RFID antenna that may be used in the communications patching systems according to embodiments of the present invention, it will be appreciated that numerous other RFID antenna designs 1 may be used.

Figure 8:
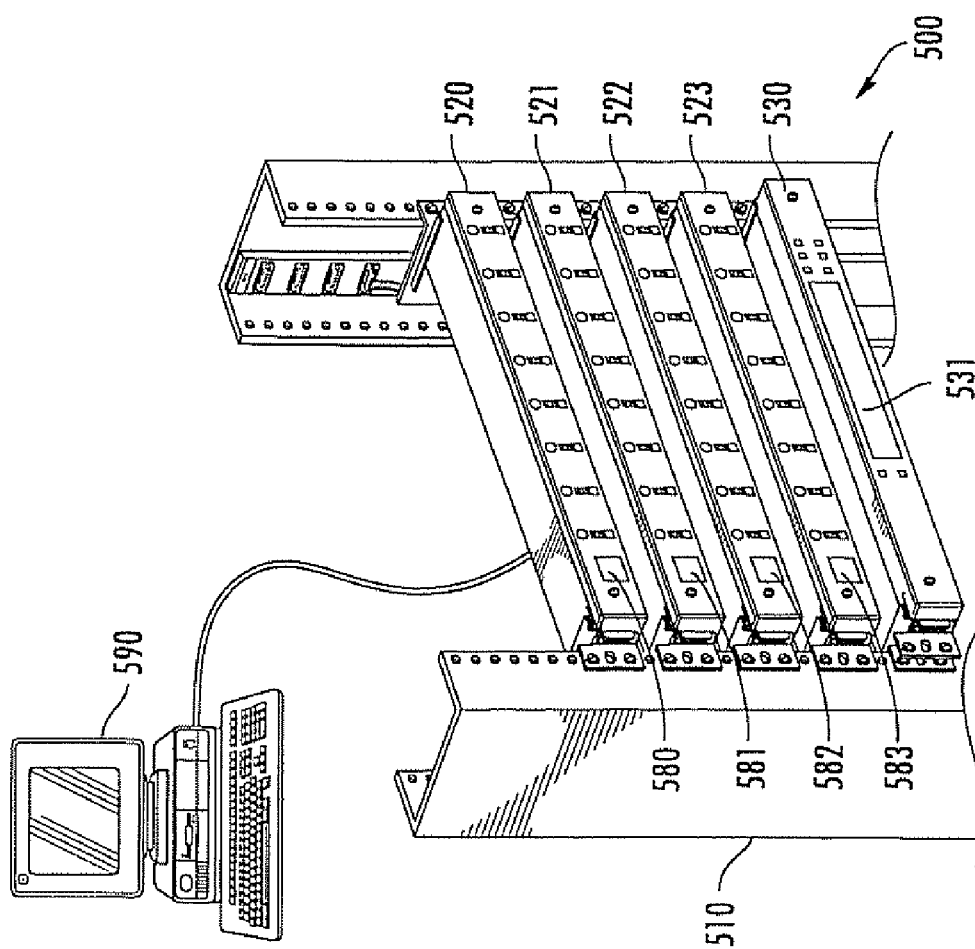
FIG. 8 is a simplified perspective view of a communication patching system in which embodiments of the present invention may be utilized.

As noted above, the controller 380 of the embodiment of FIGS. 4-6 may communicate with other system-wide control elements. FIG. 8 is a simplified perspective view of a communication patching system 500 in which embodiments of the present invention may be utilized that illustrates how a controller of a patch panel according to embodiments of the present invention may interface with such other system-wide control elements.

As shown in FIG. 8, the communications system 500 includes a plurality of patching devices 520-523 (e.g., patch panels, switches, etc.) and a rack manager 530 that are mounted to a rack 510. As shown in FIG. 8, each patching device 520-523 includes a plurality of connector ports and a respective controller 580-583. Some of the patching devices 520-523 may comprise, for example, MPO-to-MPO patch panels according to embodiments of the present invention such as, for example, patch panels 200 and 300 discussed above. The rack manager 530 may aggregate connectivity information forwarded by the controllers 580-583 on each of the patching devices 520-523 on rack 510, and may also communicate with other rack managers that are mounted on other racks (not shown in FIG. 8) to facilitate accumulation of system-wide interconnection information.

The rack manager 530 may be implemented as a panel that includes one or more integrated circuit chips. These integrated circuit chips may include a processor, flash memory, read only memory, and/or other memory devices. A database of interconnection information may be maintained in one of the memory devices. The rack manager 530 may also have one or more user interfaces (e.g., a display screen, control buttons, etc.) 531 and a bus interface. The rack managers 530 on different racks may be interconnected for communication purposes by, for example, a serial Ethernet connection.

System wide distribution and collection of connectivity information may be achieved, for example, as follows using patching device 521 as an example. The controller 581 on patching device 521 will poll each of the first sensors on patching device 521 in order to detect each time that a cord/cable is inserted into, or removed from, a connector port on the patching device 521. Upon detecting that a cord/cable has been inserted into a particular connector port, the controller 581 on patching device 521 activates a second sensor that is associated with the effected connector port in order to read a unique identifier from the cord/cable that has been inserted into the connector port. The controller 581 then transmits identification of the connector port at issue, along with the unique identifier, to the rack manager 530.

While, as noted above, in some embodiments, the controller 581 on patching device 521 may directly activate the a second sensor that is associated with the effected connector port in order to read a unique identifier from the cord/cable that has been inserted into the connector port, in other embodiments, other devices may be responsible for this activation function. For example, when the second sensor comprises an RFID antenna, the rack manager 530 may indirectly control the activation of the second sensor (i.e. the RFID circuitry) on each patching device 520-523. One reason for such an implementation is that some RFID transceivers may draw a large amount of power, and thus, in some situations, it may be desirable to ensure that only one patching device on any given rack activates it RFID transceiver at a time. Thus, in such embodiments, upon detection by the first sensors on patching device 521 that a cord/cable has been inserted into, or removed from, a connector port on the patching device 521, the controller 581 notifies the rack manager 530 regarding the patch cord insertion/removal. The rack manager 530, in turn, sends a request to the patching device 521 to read the RFID tag associated with the connector port in question. In such embodiments, if patch cords are detected by two of the patching devices 520-523 simultaneously, the rack manager 530 may issue requests to read the associated RFID tags one by one, to ensure that the rack power supply is not overburdened.

Once information identifying the connector port at issue, along with the unique identifier of the RFID tag, is obtained by the rack manager 530, the rack manager 530 may search a database of connectivity information to determine if another connector port (on patching device 521, on another of the patching devices 520, 522-523 on rack 510, or on a patching device on another rack) has a cord inserted into it that contains the same unique identifier. If so, the rack manager 530 now has the full connectivity for the patch cord in question, as it knows the rack, panel and port to which each end of the patch cord is connected. If, on the other hand, the search of the database of connectivity information does not identify another connector port having a cord inserted into it that contains the same unique identifier, then the rack manager 530 will realize that this likely means that so far only the insertion of the first end of the patch cord has been detected. In this situation, the rack manager 530 may broadcast the unique identifier of the patch cord along with the rack, panel and port into which the patch cord is inserted to other rack manager units on other racks, so that these other rack manager units will recognize the unique identifier when the other end of the patch cord is ultimately inserted into a connector port.

Likewise, when a plug is removed from a connector port on the patching device 521, the controller 581 will detect this removal by, for example, regular polling of first sensors that are provided on panel 521. Upon detection of this change, the controller 581 will notify the rack manager 530 that the connection in question has been removed. The rack manager 530 will then update the connection status of the connector port at issue. The rack manager 530 may also broadcast to at least some of the other controllers 580 information regarding the removal of the cord/cable (e.g., the unique identifier of the cord/cable, the rack, panel and connector port from which the cord/cable was removed and the fact that the change was a cord/cable removal may be broadcast). In some embodiments, this information may also be broadcast to other rack managers for subsequent broadcast to controllers on the patch panels on these other racks. In other embodiments, this information is not broadcast.

As is also shown in FIG. 8, in some embodiments of the present invention, a system manager 590 may be provided that is in communications with each of the rack managers 530. The system manager 590 may comprise, for example, a software package running on a stand alone computer. In such embodiments the system manager 590 may, for example, keep patching interconnection information for all of the devices that are part of the data center (or for a specified subset of the devices). In such embodiments, the rack managers 530 may maintain, for example, end-to-end interconnection information for all connections that run through any of the patch panels that are mounted on the rack at issue. The controllers 580-583 may keep end-to-end interconnection information for all connections that run through the particular patch panel 520-523 on which the controller 580-583 is mounted.

Pursuant to further embodiments of the present invention, MPO-to-MPO patch panels (and other types of patch panels) may be provided that include fewer RFID antennas than connector ports. By way of example, patch panels may be provided that include an RFID antenna for each connector port on the front side of the panel but do not include any RFID antennas on the back side of the patch panel. Such patch panels may be provided, for example, because the connector ports on the front and back side of each MPO coupler are in very close proximity to each other, and hence it may be difficult to provide RFID antennas that will only detect RFID tags on cables that are plugged into one of the two connector ports on any given MPO coupler.

When a single RFID antenna is used to monitor multiple connector ports, the possibility arises that the RFID antenna may simultaneously excite multiple RFID tags. Pursuant to embodiments of the present invention, arbitration techniques are provided that will allow a single RFID antenna to monitor multiple connector ports. While the discussion below focuses on the use of such arbitration techniques with respect to an MPO-to-MPO patch panel, it will be appreciated that these techniques may be used on any RFID-enabled patch panel or other patching device that uses at least some of the RFID antennas to monitor multiple connector ports. It will be noted that by using each RFID antenna to monitor multiple ports the overall cost of the patching device may be reduced.

According to some embodiments of the present invention, RFID tags having arbitration capabilities are used in the MPO patch cords and MPO-connector terminated cables that may be plugged into the MPO-to-MPO patch panel. Thus, when an RFID antenna receives signals from two or more RFID tags, instructions may be issued to the RFID tags that make it possible to read the unique identifier from each tag without interference from the other RFID tag(s).

In some embodiments of the present invention, the RFID tags for MPO patch cords and the RFID tags for MPO-connector terminated cables will be encoded in different ways so that it is possible to distinguish the MPO patch cords from the pre-terminated cables. As such, if a situation arises where both a MPO patch cord and a MPO-connector terminated cable are inserted into the respective ends of the same MPO coupler when the MPO-to-MPO patch panel is powered down, software of firmware may be used to correctly determine, at the time the MPO-to-MPO patch panel is powered up, which of the newly detected unique identifiers is associated with the patch cord on the front of the panel and which one is associated with the MPO-connector terminated cable that has been plugged into the back of the panel. In this particular embodiment, the RFID antennas are designed so that they will receive signals transmitted by RFID tags on cables/cords that are plugged into a given MPO coupler, but will not receive signals transmitted by RFID tags on cables/cords that are plugged into any of the other MPO couplers on the patch panel (i.e., the field of each RFID antenna will only cover the two connector ports of a single MPO coupler).

In some embodiments of the present invention, the arbitration may be accomplished by using RFID tags that include a "asleep" capability. When these RFID tags receive a "sleep" instruction, they will no longer transmit when excited by an RFID antenna until such time as the RFID tag receives another command canceling the "sleep" mode. Wen such RFID tags are used, the arbitration between RFID tags on cords that are plugged into the respective front and rear ends of an MPO coupler may proceed as follows.

When the first MPO connector-terminated cord/cable is inserted into, for example, the front port of the MPO coupler, it is excited when the RFID antenna associated with the MPO coupler is turned on (energized). At this point in time, there is no MPO connector-terminated cord/cable inserted into the other (rear) port of the MPO coupler. As such, only one RFID tag is excited by the RFID antenna, and no interference will exist. Consequently, the controller should be able to successfully identify the unique identifier on the RFID tag of the first MPO connector-terminated cord/cable. Thereafter, the controller issues a command to the RFID tag on the first MPO connector-terminated cord/cable that instructs the RFID tag to enter into a sleep mode. At some later point in time, a second MPO connector-terminated cord/cable is inserted into the rear port of the MPO coupler. Thereafter, the RFID tag on this second MPO connector-terminated cord/cable is excited when the RFID antenna associated with the MPO coupler is turned on (energized). The RFID tag on the first MPO connector-terminated cord/cable is in sleep mode at this time, so it will not transmit information even though the RFID antenna is turned on. Accordingly, the controller may also successfully identify the unique identifier on the RFID tag of the second MPO connector-terminated cord/cable.

The RFID tags may additionally or alternatively include information encoded therein that identifies whether the cable to which the RFID tag is connected comprises a backbone cable or a patch cord. Typically, patch cords only plug into the front of a patch panel and backbone cables only connect to the back of a patch panel. Thus, if information is encoded onto each RFID tag that identifies, for example, whether the associated cable is a backbone cable or patch cord, a single RFID antenna may be used to read the RFID tags on both the connector port on the front side of the patch panel as well as the corresponding connector port on the backside of the patch panel. The embedded information regarding the type of cord may then be used to distinguish between the two connector ports.

It should further be noted that some RFID tags are designed to support arbitration procedures such that even if two RFID tags that are not in sleep mode are simultaneously energized by the same RFID antenna, the RFID transceiver will be able to determine that more than one RFID tag is active, and issue commands that allow it to interrogate the two RFID tags one by one. The Philips Hi-Tag S series RFID tag product line is one such product line that supports this sort of arbitration procedures.

In particular, the Philips Hi-Tag S series of RFID tags arbitrate between the RFID tags on a pair of MPO connector ports that are both energized by a single RFID antenna as follows. Shortly after antenna power up, the RFID transceiver issues a command that takes the RFID tags out of transponder talk first mode. The RFID transceiver then issues a command that causes each RFID tag to transmit its unique identification code at a well defined rate, such that each RFID tag transmits each bit of its identification code at the same time that the other RED tags are transmitting the corresponding bit of their identification codes. As noted above, the identification code is programmed into each RFID tag, and is guaranteed to be absolutely unique for each RFID tag. At some point, the identification bits being transmitted by the multiple RFID tags will not match. This will be recognized by the RFID transceiver as a "collision," and the RFID transceiver will then transmit an instruction telling only the RFID tags that were transmitting, for example, a 1 when the collision occurred to continue sending the remainder of their identification bits. Each time a subsequent collision occurs, the RFID transceiver continues down one of the two branches, until it obtains a unique identification code. It then returns to a previous branch point, and takes a different path to obtain another unique identification code. This process continues until the RFID transceiver has a complete list of the unique identification codes of each excited RFID tag. Finally, using the unique identification codes obtained as described above, the RFID transceiver may send instructions to each RFID tag individually to read out additional data stored on the RFID tag (i.e., patch cord/cable identification information).

Figure 9:
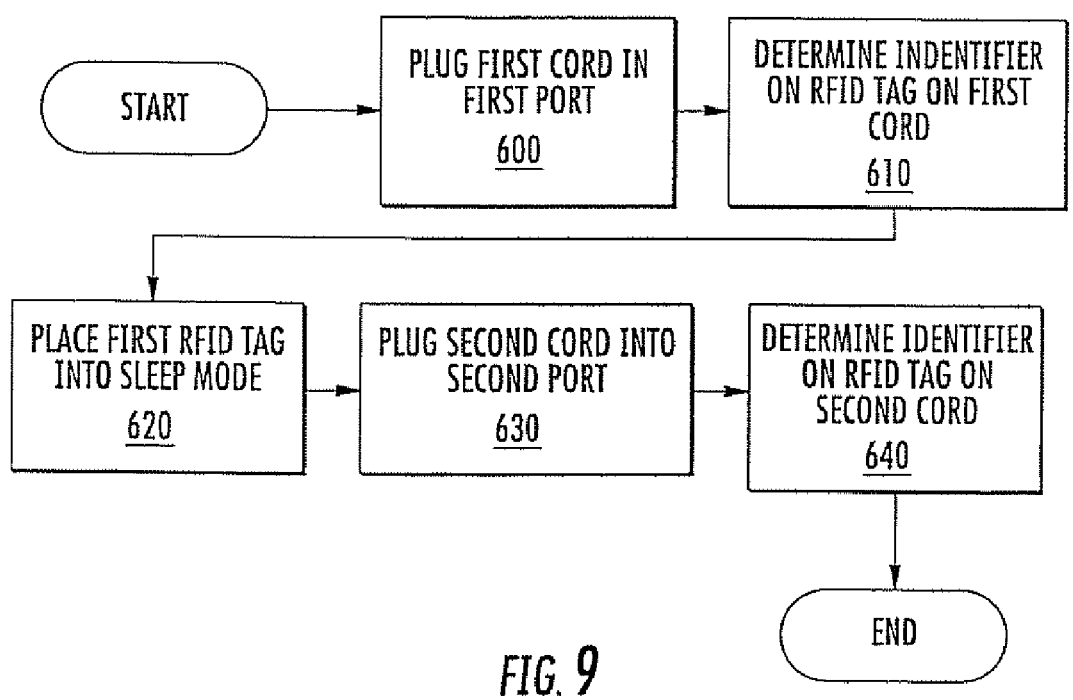
FIG. 9 is a flow chart illustrating operations for using an RFID antenna to obtain patch cord identifiers from multiple connector ports according to some embodiments of the present invention.

FIG. 9 is a flow chart illustrating operations for using an RFID antenna to identify a first identifier that is associated with a first cord that is plugged into a patch panel and to identify a second identifier that is associated with a second cord that is plugged into the patch panel according to some embodiments of the present invention. As shown in FIG. 9, pursuant to these methods, the first cord is received in a first connector port of the patch panel (block 600). An RFID antenna is then used to excite a first RFID tag that is coupled to the first cord to determine the first identifier (block 610). Then, the first RFID tag is instructed to enter into a sleep mode in which it does not transmit information (block 620). Thereafter the second cord is received in a second connector port of the patch panel (block 630). The RFID antenna is then used to excite a second RFID tag that is coupled to the second cord to determine the second identifier (block 640).

It will be appreciated that the various components of the communications patching systems according to certain embodiments of the present invention described herein may be amounted or located in different places. By way of example, the RFID antennas for a specific patch panel (or other interconnect device) may be located on, for example, (a) printed circuit boards that include circuits that are part of the individual connector ports of a patch panel, (b) one or more separate printed circuit boards that are mounted on, in or adjacent to the patch panel, or (c) other elements of the patch panel adjacent each connector port (i.e. when non-printed circuit board antennas such as small helical antennas are used). The RFID transceivers described herein may also be mounted in a variety of locations. In some embodiments, the RFID transceiver may be an integrated circuit chip that is mounted on a printed circuit board associated with each patch panel. This printed circuit board may, for example, be a printed circuit board that includes circuits that are part of at least some of the individual connector ports of a particular patch panel, a separate printed circuit board that is mounted on, in or adjacent to the patch panel, or a printed circuit board on, for example, a rack controllers. The system may include one or more RFID transceivers, and each RFID transceiver may be used to track the connectivity of (a) a subset of the connector ports on a patch panel, (b) all of the connector ports on a patch panel or (c) the connector ports on multiple patch panels. Likewise, the controllers described herein may be mounted in a variety of locations, including each of the locations discussed above where the RFID transceivers may be mounted. The controller may, but need not, be mounted on the same printed circuit board as the RFID transceiver (in embodiments where both the RFID transceiver and the controller comprise printed circuit board mountable chips, circuits or devices).

While the MPO-to-MPO patch panels according to embodiments of the present invention will often be used to patch equipment that include MPO connector output ports directly to MPO-terminated backbone cabling, it will be appreciated that the MPO-to-MPO patch panels may also be used with other equipment. For example, fan-out patch cords are commercially available that, for example, contain 6 duplex SC or LC connectors on one side of the patch cord and an MPO connector on the other side of the patch cord. Thus, equipment that has, for example, traditional SC or LC output ports can be connected to an MPO backbone cable using such a fan-out patch cord and an MPO-to-MPO patch panel. One potential advantage of such an arrangement is that a typical MPO-to-MPO patch panel may use less rack space than a patch panel that has SC or LC connector ports on one side thereof and M PO connector ports on the other side.

In the drawings and specification, there have been disclosed typical embodiments of the invention and, although specific terms are employed, they are used in a generic and descriptive sense only and not for purposes of limitation, the scope of the invention being set forth in the following claims. Moreover, those skilled in the art will readily appreciate that many modifications are possible to the exemplary embodiments that are described in detail in the present specification that do not materially depart from the novel teachings and advantages of this invention. Accordingly, all such modifications are intended to be included within the scope of this invention as defined in the claims and equivalents thereof.

That which is claimed is:

1. A patch panel having a front side and a rear side, the patch panel comprising:
   a mounting frame;
   a plurality of Multi-fiber Push On-to-Multi-fiber Push On couplers that are mounted on the mounting frame, each Multi-fiber Push On-to-Multi-fiber Push On coupler including a first connector port that is accessible from the front side of the patch panel and a second connector port that is accessible from the rear side of the patch panel;
   a first set of antennas, wherein each antenna in the first set of antennas is adjacent the first connector port of a respective one of the plurality of Multi-fiber Push On-to-Multi-fiber Push On couplers and is configured to read an identifier that is included in or on a first Multi-fiber Push On connector terminated cable that is inserted in the first connector port of the respective one of the plurality of Multi-fiber Push On-to-Multi-fiber Push On couplers; and
   a second set of antennas, wherein each antenna in the second set of antennas is adjacent the second connector port of a respective one of the plurality of Multi-fiber Push On-to-Multi-fiber Push On couplers and is configured to read an identifier that is included in or on a second Multi-fiber Push On connector terminated cable that is inserted in the second connector port of the respective one of the plurality of Multi-fiber Push On-to-Multi-fiber Push On couplers.

2. A patch panel having a front side and a rear side, the patch panel comprising:
   a mounting frame;
   a plurality of Multi-fiber Push On-to-Multi-fiber Push On couplers that are mounted on the mounting frame, each Multi-fiber Push On-to-Multi-fiber Push On coupler including a first connector port that is accessible from the front side of the patch panel and a second connector port that is accessible from the rear side of the patch panel;
   a first set of antennas, wherein an antenna from the first set of antennas is adjacent the first connector port of each respective Multi-fiber Push On-to-Multi-fiber Push On coupler;
   a second set of antennas, wherein an antenna from the second set of antennas is adjacent the second connector port of each respective Multi-fiber Push On-to-Multi-fiber Push On coupler;
   a first printed circuit board mounted at the front side of the patch panel; and
   a second printed circuit board mounted at the rear side of the patch panel.

3. The patch panel of claim 2, further comprising:
   a first set of sensors, wherein a sensor from the first set of sensors is adjacent the first connector port of each respective Multi-fiber Push On-to-Multi-fiber Push On coupler and is configured to detect when a connector on a first Multi-fiber Push On connector terminated cable is inserted within the first connector port of its respective Multi-fiber Push On-to-Multi-fiber Push On coupler; and a second set of sensors, wherein a sensor from the second set of sensors is adjacent the second connector port of each respective Multi-fiber Push On-to-Multi-fiber Push On coupler and is configured to detect when a connector on a second Multi-fiber Push On connector terminated cable is inserted within the second connector port of its respective Multi-fiber Push On-to-Multi-fiber Push On coupler.

4. The patch panel of claim 3, wherein each sensor in the first and second sets of sensors comprises the combination of an infrared source and an infrared detector.

5. The patch panel of claim 3, wherein the first printed circuit board includes a plurality of cut out portions, each of which exposes the first connector port of a respective one of the plurality of Multi-fiber Push On-to-Multi-fiber Push On couplers, and wherein the second printed circuit board includes a plurality of cut out portions, each of which exposes the second connector port of a respective one of the plurality of Multi-fiber Push On-to-Multi-fiber Push On couplers.

6. The patch panel of claim 2, further comprising a first radio frequency identification transceiver on the first printed circuit board and a second radio frequency identification transceiver on the second printed circuit board, wherein the first radio frequency identification transceiver is coupled to at least some of the first set of antennas, and the second radio frequency identification transceiver is coupled to at least some of the second set of antennas.

7. The patch panel of claim 6, further comprising:
a first switching circuit coupled between an output of the first radio frequency identification transceiver and the first set of antennas that is configured to selectively couple one of the first set of antennas to the output of the first radio frequency identification transceiver; and
a second switching circuit coupled between an output of the second radio frequency identification transceiver and the second set of antennas that is configured to selectively couple one of the second set of antennas to the output of the second radio frequency identification transceiver; and
a controller that is configured control the first and second radio frequency identification transceivers and the first and second switching circuits.

8. The patch panel of claim 1, wherein the first connector ports are configured to receive patch cords, and wherein the second connector ports are configured to receive backbone cabling.

9. A communications system, comprising:
a patch panel having a mounting frame and a Multi-fiber Push On-to-Multi-fiber Push On coupler that is mounted on the mounting frame, the Multi-fiber Push On coupler including a first connector port that is accessible from a front side of the patch panel and a second connector port that is accessible from a rear side of the patch panel, an RFID antenna mounted on one of the front or rear side of the patch panel and an RFID transceiver that is coupled to the RFID antenna;
a first communications cable having a first connector that includes a first RFID tag attached to a first end of the first communications cable, the first connector inserted within the first connector port;
a second communications cable having a second connector that includes a second RFID tag attached to a first end of the second communications cable, the second connector inserted within the second connector port;
wherein the RFID antenna is configured to receive information transmitted by both the first RFID tag and the second RFID tag.

10. A patch panel having a front side and a rear side, the patch panel comprising:
a mounting frame;
a plurality of connector ports;
a plurality of RFID antennas, wherein at least some of the RFID antennas are designed to energize RFID tags that are included on cables that are inserted into at least two of the plurality of connector ports;
an RFID transceiver that is configured to be selectively coupled to each of the plurality of RFID antennas; and
a controller,
wherein the connector ports are provided on both the front side and the rear side of the patch panel,
wherein the RFID antennas are located on only one of the front or rear side of the patch panel,
wherein at least some of the RFID antennas are designed to energize RFID tags that are included on cables that are inserted into connector ports located on both the front and rear side of the patch panel, and
wherein the controller is configured to determine whether a respective one of the cables is a patch cord that inserted into a front connector port or a backbone cable that is inserted into a rear connector port based on the identification information transmitted by the RFID tag associated with the cable.

11. The patch panel of claim 10, wherein the patch panel comprises a Multi-fiber Push On-to-Multi-fiber Push On patch panel.

12. The patch panel of claim 10, wherein the controller is configured to send a command that places an RFID tag into sleep mode after reading an identifier that is transmitted by the RFID tag.

* * * * *

UNITED STATES PATENT AND TRADEMARK OFFICE
CERTIFICATE OF CORRECTION

PATENT NO. : 8,203,450 B2
APPLICATION NO. : 11/968360
DATED : June 19, 2012
INVENTOR(S) : German et al.

It is certified that error appears in the above-identified patent and that said Letters Patent is hereby corrected as shown below:

In the Specifications:
Column 8, Line 16:
  Please correct "patch cord 1691 is plugged into"
    to read -- patch cord 169' is plugged into --
Column 8, Line 27:
  Please correct "and patch panels 130', 150', 150' are"
    to read -- and patch panels 130', 150, 150' are --
Column 10, Line 16:
  Please correct "overlays 312, 327 cover and"
    to read -- overlays 312, 322 cover and --
Column 14, Line 29:
  Please correct "The terran "switch" is used"
    to read -- The term "switch" is used --
Column 14, Line 65:
  Please correct "antenna designs 1 may be used."
    to read -- antenna designs may be used. --

In the Claims:
Column 21, Claim 7, Line 43:
  Please correct "that is configured control the first"
    to read -- that is configured to control the first --

Signed and Sealed this
Sixteenth Day of April, 2013

Teresa Stanek Rea
*Acting Director of the United States Patent and Trademark Office*